United States Patent [19]
Heinrich et al.

[11] 3,825,329
[45] July 23, 1974

[54] MOTION PICTURE CAMERA HAVING MEANS FOR SIMULTANEOUSLY SELECTING THE FILM SPEED AND THE CORRESPONDING APERTURE SIZE

[75] Inventors: Frank-Armin Heinrich; Hans-Friedrich Kiefer, both of Stuttgart, Germany

[73] Assignee: Robert Bosch Photokino GmbH, Stuttgart, Germany

[22] Filed: Mar. 19, 1973

[21] Appl. No.: 342,812

[30] Foreign Application Priority Data
Mar. 22, 1972 Germany............................ 2213837

[52] U.S. Cl................. 352/141, 352/180, 352/209
[51] Int. Cl. ............................................ G03b 7/08
[58] Field of Search .......... 352/141, 170, 176, 180, 352/209

[56] References Cited
UNITED STATES PATENTS
3,044,347  7/1962  MacMillin.......................... 352/176
3,583,800  6/1971  Hirata............................... 352/180

Primary Examiner—Samuel S. Matthews
Assistant Examiner—Russell E. Adams, Jr.
Attorney, Agent, or Firm—Michael S. Striker

[57] ABSTRACT

A motion picture camera is adapted to operate at a first and second film speed and requires a first and second aperture size at the first and second film speed, respectively. A speed regulator regulates the speed of the camera to the first and second speed, respectively, when connected to the battery through a first and second resistor, respectively. Aperture control means open the aperture to the aperture size corresponding to the first film speed when connected to the battery through a third resistor and open the aperture to the second aperture size corresponding to the second film speed when connected to the source of electrical energy through a fourth resistor. First, second, third and fourth transistors connect the corresponding respective resistors to the battery when in a conductive state. A speed selector switch is externally operable to select the first or second speed. Connected to the speed selector switch is a control transistor which is interconnected with the bases of the first, second, third and fourth transistors in such a way that the first and third resistor is connected to the battery when the speed selector switch is in the first position and that the second and fourth transistors are conductive when the speed selector switch is in the second position.

4 Claims, 1 Drawing Figure

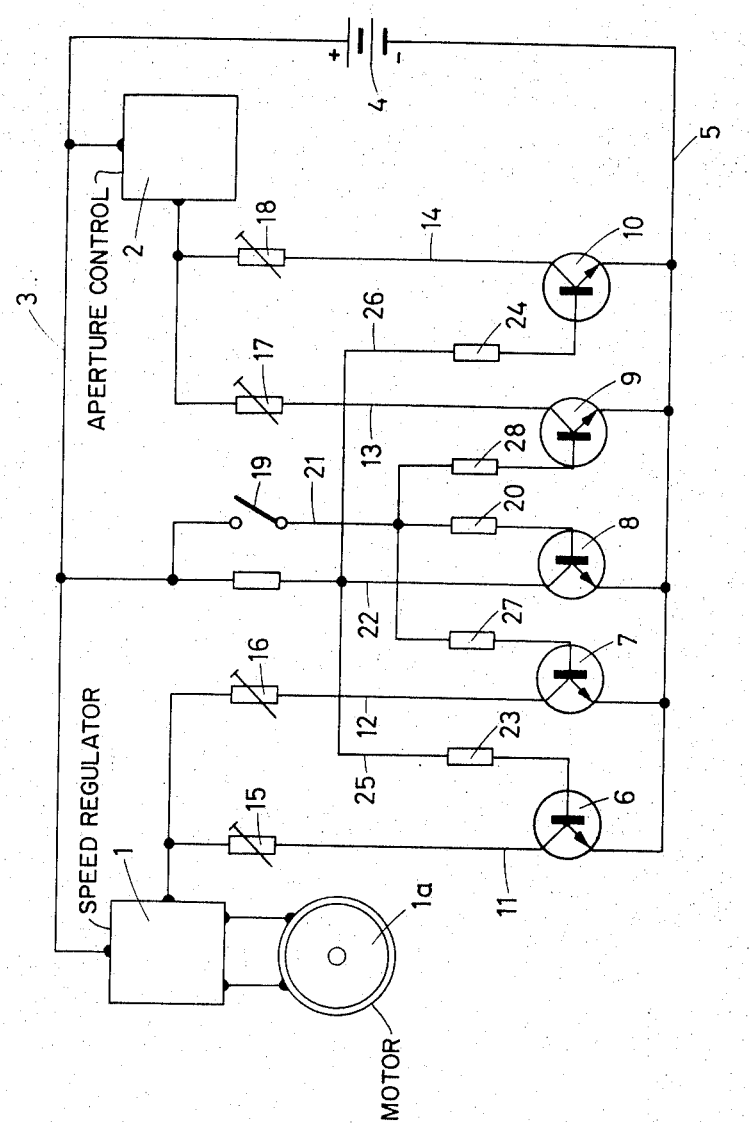

MOTION PICTURE CAMERA HAVING MEANS FOR SIMULTANEOUSLY SELECTING THE FILM SPEED AND THE CORRESPONDING APERTURE SIZE

BACKGROUND OF THE INVENTION

The present invention relates to motion picture cameras in which the speed of the film drive may be changed during operation. It relates to such cameras wherein a photoelectric control arrangement is present for controlling the lens opening. Speed regulators for such cameras are known, in which the speed of the motor varies as a function of the voltage or current applied thereto. Therefore, the motor speed in such cameras can be regulated by changing the impedance connected between the speed regulator and the source of electrical energy, for example a battery. Similarly, means are known for controlling the lens opening automatically as a function of the available light for an exposure, by means of, for example, a photoresistor. The movable element of the moving coil instrument is them mechanically coupled to control the lens opening. In such regulators the lens opening is a function of the current flowing through the moving coil instrument. Thus the lens opening can be controlled by changing the impedance (for example, the resistance) in the circuit between the moving coil instrument and the battery.

It is clear that when the speed of the motion picture camera is changed, an inversely proportional change in the exposure time results and this must be compensated for by a change in the lens opening. This change in the lens opening should take place automatically, substantially simultaneously with the change in the speed of the film and in a reliable and economic manner.

SUMMARY OF THE INVENTION

It is the object of the present invention to furnish an arrangement wherein the lens opening is changed simultaneously with the change in speed of a motion picture camera.

The present invention resides in a motion picture camera adapted for operation at at least a first and second film speed and requiring a first and second lens opening at said first and second speeds respectively. It comprises an arrangement for simultaneously selecting said first or said second film speed and the corresponding lens opening. This arrangement comprises a source of electrical energy. It further comprises first, second, third and fourth impedance means. Speed regulator means are furnished for regulating said film speed to said first speed when connected to said source of electrical energy through said first impedance means and to said second speed when connected to said source of electrical energy through said second impedance means. Also furnished are aperture control means for controlling the lens opening to a first lens opening when connected to said source of electrical energy through said third impedance means and for opening said lens to said second lens opening when connected to said source of electrical energy through said fourth impedance means. Also provided are first and second electronic switch means, each having a conductive state in response to a control signal, and a non-conductive state, for connecting said aperture control means to said source of electrical energy through said third and fourth impedance means, respectively, when in said conductive state. Speed selector switch means are also furnished, which are adapted for external activation to a first or second selector position. Finally, electronic control switch means are provided which are connected to said speed selector switch means for furnishing said control signal to said first and third electronic switch means when said speed selector switch means is in said first selector position and to said second and fourth electronic switch means when said speed selector switch means is in said second selector position, whereby the corresponding lens opening is selected substantially simultaneously with the selection of one of said film speeds.

In a preferred embodiment of the present invention the first, second, third and fourth electronic switch means are transistors, all having bases connected to the electronic control switch means.

The electronic control switch means can be a further transistor into whose collector circuit is connected the pair of transistors associated with the first speed and to whose base circuit are connected the bases of the pair of transistors associated with the second speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE shows a circuit diagram of the preferred embodiment of the present invention.

DESCRIPTION OF THE PREFERRED EMBODIMENTS

A preferred embodiment of the present invention will now be described with reference to the drawing.

In the FIGURE, reference numeral 1 denotes a speed regulator arrangement for the motor 1a of a motion picture camera. Reference numeral 2 refers to photoelectric aperture control means which control the lens opening and which were described under the background of the invention, as was the speed regulator arrangement 1. Neither of these arrangements is new and both of them are, therefore, indicated as blocks only.

Both speed regulator 1 and aperture control means 2 are connected to the positive side of a battery 4 which serves as a source of electrical energy via a line 3. A line 5 is connected to the negative side of battery 4 and to it are connected the emitters of NPN transistors 6, 7, 8, 9 and 10. Transistors 6, 7, 10 and 9 respectively serve as first, second, third and fourth electronic switch means, while transistor 8 constitutes electronic control switch means. Lines 11, 12, 13 and 14 are connected to the collectors of transistors 6, 7, 9 and 10, respectively. The speed regulating input of speed regulator 1 is connected to line 11 through a resistor 15, one embodiment of first impedance means, and is further connected to line 12 through a variable resistor 16, one embodiment of second impedance means. The third impedance means are represented by variable resistor 18 connected between the aperture control means 2 and line 14, while the fourth impedance means are represented by variable resistors 17 connected between the aperture control means 2 and line 13.

The resistors 15 and 16 are so adjusted that, when transistors 6 and 7 become conductive respectively, the motor speed is adjusted to result in a frame frequency of 18 frames per second and 54 frames per second, respectively. Thus resistor 15 which controls the speed regulator to effect the lower frame frequency is a relatively high resistance resistor, while the resistance of resistor 16, which becomes effective when the frame speed is the higher speed, is relatively lower.

Resistors 17 and 18, of which resistor 17 becomes effective simultaneously with resistor 16 and resistor 18 becomes effective simultaneously with resistor 15, cause the aperture control means to furnish lens openings which correspond to the respective speeds.

Transistor 8, which is one embodiment of electronic control switch means, has a collector connected via a line 22 and a collector resistor to line 3. The base of transistor 8 is connected through a resistor 20 to a line 21 which in turn is connected to one terminal of a switch 19 which constitutes one embodiment of speed selector switch means. The other terminal of switch 19 is connected to line 3. The bases of transistors 6 and 10 are connected to the collector of transistor 8 through resistors 23 and 24, respectively, while the bases of transistors 7 and 9 are connected to line 21 through resistors 27 and 28, respectively. Resistors 23, 24, 27 and 28 constitute current limiting resistors, as does resistor 20.

The above-described arrangement operates as follows:

When speed selector switch 19 is open, the camera operates at the lower speed. The NPN control transistor 8 is blocked, which causes a positive potential to be applied to the bases of transistors 6 and 10, causing these transistors to become conductive. Speed regulator means 1 and the aperture control means 2 receive current via line 3 and lines 11 and 14 from the battery 4, the amplitude of the current being limited by resistors 15 and 18 in such a manner that the motor rotates at the speed required for effecting the low frame frequency and that the aperture control means control the lens opening to the corresponding lens opening. Transistors 7 and 9 are blocked so that resistors 16 and 17 are disconnected from the circuit and do not influence either the motor speed or the operation of the aperture control means.

If the camera is to be switched to the higher frame speed temporarily during operation, the photographer closes switch 19. This causes a positive voltage to be applied to the base of transistor 8, causing this transistor to become conductive. The collector-emitter circuit of transistor 8 thus has a very low resistance. This causes transistors 6 and 10 to be blocked almost instantaneously, while transistors 7 and 9 are simultaneously made conductive since a positive potential is now also applied to their bases. Speed regulator 1 now receives a current through resistor 16 and line 12 which causes the speed to assume the higher speed required for the higher frame frequency. Simultaneousy the aperture control means 2 are connected through resistor 17 and line 13 to the battery, which causes the current flow therethrough to be such that the lens opening is the second lens opening, that is a wider opening, corresponding to the higher speed of the film. Thus the shorter exposure time resulting from the increase in film speed is immediately compensated for.

If switch 19 is now again released, this returns to the position shown in the FIGURE. At this point both transistor 8 and transistors 7 and 9 are blocked simultaneously, while transistors 6 and 10 again become conductive. The camera is thus again being operated at the lower speed, that is the speed of the motor is determined by resistor 15, while the aperture is controlled by the current flowing through resistor 18 in conjunction of course with the photoresistance which furnishes the signal indicative of the available light for the exposure.

It is seen that the present arrangement constitutes a simple and effective system for simultaneously adjusting the lens opening and the speed of the camera from a first to a second speed, while maintaining the same exposure.

While the invention has been illustrated and described as embodied in specific forms of electronic switches, it is not to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a motion picture camera adapted for operation at a first and second film speed and requiring a first and second lens opening for equal exposure at said first and second speed respectively, an arrangement for simultaneously selecting said first or said second film speed and the corresponding lens opening comprising, in combination, a source of electrical energy; first, second, third and fourth impedance means; speed regulator means for regulating said film speed to said first speed when connected to said source of electrical energy through said first impedance means and to said second speed when connected to said source of electrical energy through said second impedance means; aperture control means for furnishing said first lens opening when connected to said source of electrical energy through said third impedance means and for furnishing said second lens opening when connected to said source of electrical energy through said fourth impedance means; first and second electronic switch means, each having a conductive state in response to a control signal, and a non-conductive state, for connecting said speed regulator means to said source of electrical energy through said first and second impedance means, respectively, when in said conductive state; third and fourth electronic switch means each having a conductive state responsive to a control signal, for connecting said aperture control means to said source of electrical energy through said third and fourth impedance means, respectively, when in said conductive state; speed selector switch means adapted for external activation to a first or second selector position; and electronic control switch means connected to said speed selector switch means for furnishing said control signal to said first and third electronic switch means when said speed selector switch means is in said first selector position and to said second and fourth electronic switch means when said speed selector switch means is in said second selector position, whereby the corresponding lens opening is selected substantially simultaneously with the selection of one of said film speeds.

2. An arrangement as set forth in claim 5, wherein said first, second, third and fourth electronic switch means respectively comprise a first, second, third and fourth transistor, each of said transistors having a base connected to said electronic control switch means.

3. An arrangement as set forth in claim 2, wherein said electronic control switch means comprise a fifth transistor having an emitter, collector, and a base; and wherein said bases of said first and third transistor are connected to said collector of said fifth transistor and said bases of said second and fourth transistor are connected to said base of said fifth transistor.

4. An arrangement as set forth in claim 3, wherein said speed selector switch means comprise a mechanical switch, having an open and a closed position respectively corresponding to said first and second selector positions, for interconnecting said base of said fifth transistor to said source of electrical energy, in such a manner that said fifth transistor is in a conductive state when said mechanical switch is closed and said fifth transistor is in a non-conductive state when said mechanical switch is open.

* * * * *